United States Patent [19]
Ayala

[11] Patent Number: 5,809,130
[45] Date of Patent: Sep. 15, 1998

[54] SYSTEM AND METHOD FOR SELECTIVELY RETRIEVING COMMUNICATIONS FROM ANY SELECTED LOCATION

[75] Inventor: Rajasekhar Ayala, Louisville, Colo.

[73] Assignee: U S West Advanced Technologies, Inc., Boulder, Colo.

[21] Appl. No.: 88,696

[22] Filed: Jul. 8, 1993

[51] Int. Cl.$^6$ ........................................... H04Q 3/64
[52] U.S. Cl. .................. 379/266; 379/211; 379/217; 379/265; 379/309; 455/31.2; 455/31.3; 455/459
[58] Field of Search ................... 379/142, 250, 379/57, 211, 265, 266, 309, 217; 455/31.2, 459, 31.3

[56] References Cited

U.S. PATENT DOCUMENTS

| | | | |
|---|---|---|---|
| 3,737,587 | 6/1973 | Romero | 379/210 |
| 4,178,475 | 12/1979 | Taylor et al. | 455/31.2 |
| 4,313,035 | 1/1982 | Jordan et al. | 455/31.2 |
| 4,642,425 | 2/1987 | Guinn, Jr. et al. | 455/31.2 |
| 4,674,115 | 6/1987 | Kaleita et al. | 379/211 |
| 4,680,785 | 7/1987 | Akiyama et al. | 379/142 |
| 4,942,598 | 7/1990 | Davis | 379/211 |
| 5,063,588 | 11/1991 | Patsiokas et al. | 455/31.2 |
| 5,086,394 | 2/1992 | Shapira | 455/31.2 |
| 5,144,648 | 9/1992 | Bhagat et al. | 455/31.2 |
| 5,151,929 | 9/1992 | Wolf | 455/31.2 |
| 5,153,902 | 10/1992 | Buhl et al. | 455/414 |
| 5,185,782 | 2/1993 | Srinivasan | 379/266 |
| 5,206,901 | 4/1993 | Harlow et al. | 379/211 |
| 5,260,986 | 11/1993 | Pershan | 379/211 |
| 5,307,399 | 4/1994 | Dai et al. | 455/459 |
| 5,311,570 | 5/1994 | Grimes et al. | 455/31.3 |
| 5,315,636 | 5/1994 | Patel | 379/211 |
| 5,327,480 | 7/1994 | Breeden | 455/459 |
| 5,327,486 | 7/1994 | Wolff et al. | 379/211 |
| 5,329,578 | 7/1994 | Brennan et al. | 379/201 |
| 5,375,162 | 12/1994 | Kim et al. | 455/459 |
| 5,414,750 | 5/1995 | Bhagat et al. | 455/459 |
| 5,430,791 | 7/1995 | Feit et al. | 379/211 |
| 5,444,774 | 8/1995 | Friedes | 379/266 |
| 5,644,626 | 7/1997 | Carlsen et al. | 455/459 |

*Primary Examiner*—Krista Zele
*Assistant Examiner*—Scott Wolinsky
*Attorney, Agent, or Firm*—Brooks & Kushman P.C.

[57] ABSTRACT

A communication system operative to retrieve communications from a plurality of calling parties by a called party at a plurality of selected secondary party locations, each having a corresponding Customer Premises Equipment (CPE) device and a communication address. The system includes a switch which is provided in electrical communication with the calling party CPE devices and secondary party CPE devices. The system may be adapted for use in both Advanced Intelligent Networks (AINs) and non-AIN arrangements. The system may similarly be provided with Automatic Call Distribution (ACD) architecture or, in specified AIN arrangements, with advanced functionality controlled by a properly interfaced Service Control Point (SCP). The system is operative to place the incoming communication on queue while notifying the secondary party, i.e., the intended recipient, of the communication. This notification may be provided through a dedicated land-line or through a wireless communication network such as a cellular telephone system. Upon notification, the communication system provides for identification means which may include, for example, a log-in number unique to the secondary party which must be entered to retrieve the incoming communication.

3 Claims, 1 Drawing Sheet

SYSTEM AND METHOD FOR SELECTIVELY RETRIEVING COMMUNICATIONS FROM ANY SELECTED LOCATION

TECHNICAL FIELD

This invention relates generally to communication networks and, more particularly, to a system for selectively retrieving communications from a plurality of Customer Premises Equipment (CPE) devices placed at different geographic locations and having corresponding communication addresses.

BACKGROUND ART

As communication technology has advanced, the use of multiple Customer Premises Equipment (CPE) devices has increased accordingly. For example, it is now common for even a small business to have numerous telephones which may be linked via an internal network. Each of these telephones must be addressed by a unique calling number, internal exchange number, and corresponding communication address.

As those skilled in the art will recognize, a common problem for such users occurs when a communication call is sought to be connected to an intended recipient who is not at his or her normal or customary office or station, yet available to receive or be notified of a call at an alternative destination. The alternative destination may be at the recipient's place of business or within a specified range of wireless transmission. Under such circumstances, the recipient will ordinarily miss the communication unless a paging system is utilized. Conventional paging systems have generally incorporated Public Address (PA) systems which manually announce the incoming communication along with identifying information regarding the storage position where the incoming communication has been placed. In telephone communications, for example, an operator paging Ms. Jones with a telephone call from Mr. Smith which has been stored on line 58 may announce "Mr. Smith, Ms. Jones on 58." Still further, where Voice Messaging Systems (VMS) have been implemented, the call may be forwarded to a specified voice mailbox where the caller will receive a pre-recorded message and may then leave a message to be retrieved by the intended recipient at a later time.

As readily seen, such conventional paging systems suffer in that they are manually operated and require the recipient to not only be notified of an incoming communication but to be further notified of where the communication has been stored. As a result, the exchange operator must juggle numerous calls in an effort to take written messages, page intended recipients, respond to inquiries from recipients as to the placement of calls and further respond to impatient and often disgruntled callers. If the intended recipient fails to respond to the page, the call is usually returned to the exchange operator for further action. Thus, each incoming call must be handled at least twice. Such activity is wasteful of time and resources which could more properly be spent by the exchange operator answering new incoming calls or responding to customer inquiries. Moreover, in the event that a call cannot be completed because the intended recipient cannot be located, the desired action cannot be taken which may result in substantial economic loss to the recipient as well as his or her business.

One attempt to address the difficulties encountered in such situations is disclosed in U.S. Pat. No. 3,737,587 issued to Romero for a telephone switching system having call pick-up service.

Romero essentially discloses a private branch exchange (PBX) system which enables calls to be answered by stations other than those to which they are directed. The system subdivides its stations into a number of groups typically based on the stations' geographic location—stations in the same room would likely be in the same group. By dialing a specific pick-up code, a station user may answer a call directed to any other station of the same group. More specifically, the call pickup sequence is activated when a subscriber at a requesting station dials the pickup code to answer a call incoming to another station. The dialing of the pickup code is detected by a register that identifies the requesting station. The system then scans all trunk circuits to determine which are currently in ringing condition (each circuit that has not been answered is in ringing condition). Next, the circuits in ringing condition are further analyzed to determine whether the trunk circuit is connected to a station in the same pickup group as that of the requesting station. If part of the same group, the scanning operation is terminated and a connection between the trunk circuit and the line circuit of the requesting station is established.

The present invention offers substantial advantages over Romero. First, stations are not divided into groups dependent on physical proximity. Unlike Romero wherein an individual may pick up a call directed to another station only if both stations are in the same group, the present invention provides an individual with the capability to pick up a call from any station, regardless of its location. Therefore, an individual may be able to access a call even from a geographically distant station, such as a station located in a different building or town.

A second advantage of the present invention over Romero accrues from the fact that a ringing condition need not exist at the time call pickup is invoked by the requesting station. Since many callers may terminate their call if there is no response after three or four rings, the system disclosed by Romero allows only this limited time for a recipient to respond to the incoming call. However, the present invention responds to the incoming call by placing it in a queue and notifying the intended recipient. Thus the system allows the intended recipient more time to respond resulting in a greater number of successful call connections. Therefore, unlike Romero where the trunk circuits are scanned to determine which are in ringing condition and have not been answered, no scanning is necessary in the present invention.

Another advantage of the present invention is that the intended recipient of the incoming call is uniquely identified by the system and then notified whereas in Romero, the intended recipient must be identified by one of the group members, usually by audio recognition of which station is ringing. Another limitation of the invention disclosed by Romero not found in the present invention is the ability to handle a plurality of concurrent incoming calls directed to the same group. Since the present invention uniquely identifies the intended recipient, there is no problem of priority contention among group members. For example, in Romero's system if an incoming call to station A is immediately followed by an incoming call to station B, (where A and B belong to the same group) it is not possible to pickup B's incoming call prior to A's. In the present invention, the incoming calls are uniquely identified and parked on a queue while the desired recipient is notified of the existence of the call. Upon notification, the recipient merely enters a predetermined log-in number from any station and the system automatically connects the call to that station so a priority contention problem does not exist.

Yet another advantage of the present invention not found in Romero is the ability to notify the intended recipient of the existence of the incoming call when distant from the called station. In Romero, the intended recipient must be within hearing range of her station and must use another station within her group to pickup the call after it is recognized. In the present invention, the intended recipient may be at a remote location, out of hearing range of the ringing station, and use any station to connect to the incoming call.

DISCLOSURE OF THE INVENTION

It is an object of the present invention to overcome the limitations of the prior art by providing a communication system operative to retrieve communications from calling parties by a called party at a plurality of selected secondary party locations, each having a corresponding Customer Premises Equipment (CPE) device and a communication address.

A more specific object of the present invention is the provision of a communication retrieval system for retrieving communications from a calling party having CPE device which are directed to a secondary party having a single calling number for a plurality of CPE devices, each of which is placed at a different geographic location and has a corresponding communication address.

Yet another object of the present invention is the provision of a method of retrieving communications from a calling party at a plurality of secondary party locations.

Another more specific object of the present invention is the provision of a method of retrieving communications routed from a calling party CPE device to a secondary party having a single calling number for a plurality of CPE devices, each of which is placed at a different geographic location and has a corresponding communication address.

In carrying out the above objects, there is provided a system for retrieving communications which includes switching means which is further provided in electrical communication with the calling party CPE device and a plurality of secondary party CPE devices. The system may be adapted for use in both Advanced Intelligent Networks (AIN) and non-AIN arrangements. Similarly, the switching means may be provided with Automatic Call Distribution (ACD) architecture or, in specified AIN arrangements, with advanced functionality controlled by a properly interfaced Service Control Point (SCP).

As disclosed herein, the switching system is operative to place the incoming communication on queue while notifying the secondary party (intended recipient) of the communication. Such notification may be through a dedicated land-line or through a wireless communication network such as a cellular telephone system. Upon notification, the system further includes identification means which may include, for example, a log-in number unique to the secondary party which must be entered to retrieve the incoming communication.

In keeping with the invention, the method steps disclosed herein include the initial provision of switching means which, as referenced above, may be adapted for use in an Advanced Intelligent Network (AIN) and may also include Automatic Call Distribution (ACD) architecture. The switching means is provided in electrical communication with the calling party CPE device and a plurality of secondary party CPE devices. Once a communication has been initiated, such as a telephone call, for example, the communication is routed from the calling party CPE device to the switching means wherein the calling number is identified as that of a subscribing secondary party. Once identified, the communication is internally parked on queue while selected paging operations are performed in an attempt to locate the secondary party. These paging operations may include, for example, a manually operated Public Address (PA) system for announcing the incoming call, a digitized paging system preprogrammed to announce calls as well as the transmission of a wireless signal to a portable telephone, beeper or the like. Upon receipt of the notification signal, the recipient may retrieve the communication at one of several subscribing CPE devices by entering a predetermined log-in number.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
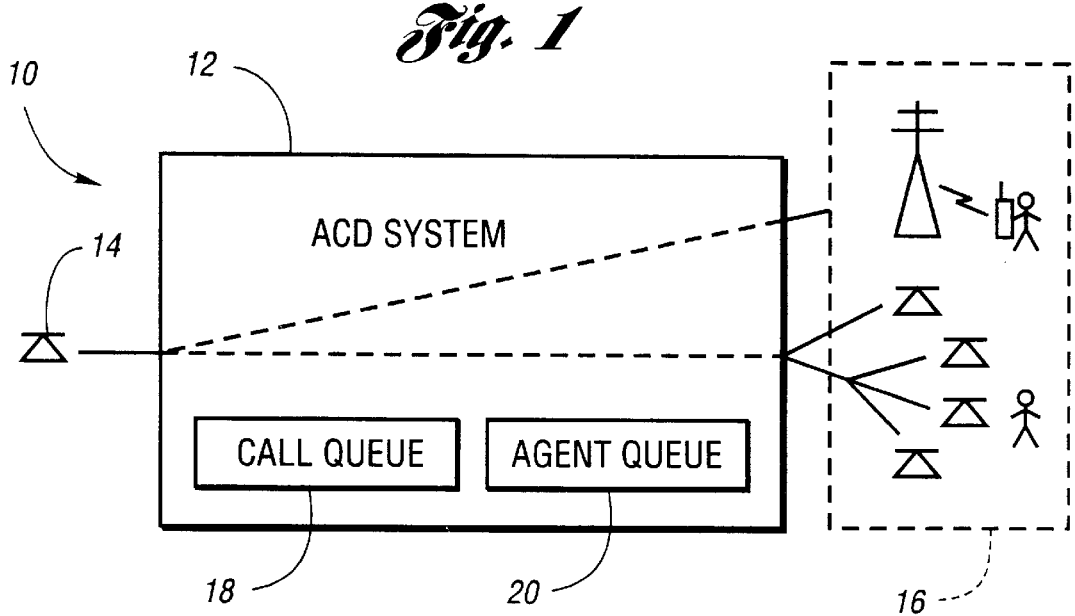
FIG. 1 is a schematic diagram of the communication retrieval system of the present invention.

With reference to FIG. 1 of the drawings, there is provided a simplified schematic block diagram of the communications retrieval system of the present invention designated generally by reference numeral 10. System 10 includes switching means such as central office switch 12 which is provided in electrical communication with the calling party CPE device such as a telephone 14, a plurality of subscribing secondary party CPE devices such as telephones 16, a call queue 18, and an agent queue 20. Significantly, switching means 12 may be provisioned with Automatic Call Distribution (ACD) architecture such that communications may be parked on call queue 18 in the ACD while the ACD performs selected routing functions in an attempt to locate the secondary party at one of the corresponding communication addresses of secondary party CPE devices 16. Such routing may be performed in addition to or as an alternative to the retrieval functions disclosed herein. Switching means 12 may further be adapted for use in both Advanced Intelligent Networks (AIN) which incorporate Automatic Call Distribution architecture as well as AIN networks which utilize advanced functionality for achieving the same location sequencing operations.

The operation of the above described communications retrieval system of the present invention may be explained for use in telephone communications as shown in FIG. 1. As seen, both the calling party and secondary party CPE devices 14 and 16, respectively, are designated as telephones. In operation, a calling party may originate a call from calling party CPE device 14 which is routed to switching means 12. Upon receipt, the called number is identified as corresponding to a subscribing secondary party and the call is temporarily placed on call queue 18 while the subscriber is notified of the incoming communication. Such notification may include manually or electronically paging the secondary party via a Public Address (PA) or digital paging system as well as generating a wireless notification signal for receipt by a mobile telephone or pager.

Upon receipt of the notification signal, the secondary party will then access the call. An important feature of this invention enables the secondary party to access the call from any of the numerous secondary party CPE devices regardless of their geographic locations. Upon entering a predetermined log-in number, the secondary party is put on agent queue 20. Next, system 10 connects the calling party with the secondary party. As readily seen, the use of such log-in numbers reduces the amount of information required along with the notification announcement and operates to eliminate misdirected and inadvertently retrieved communications.

Figure 2:
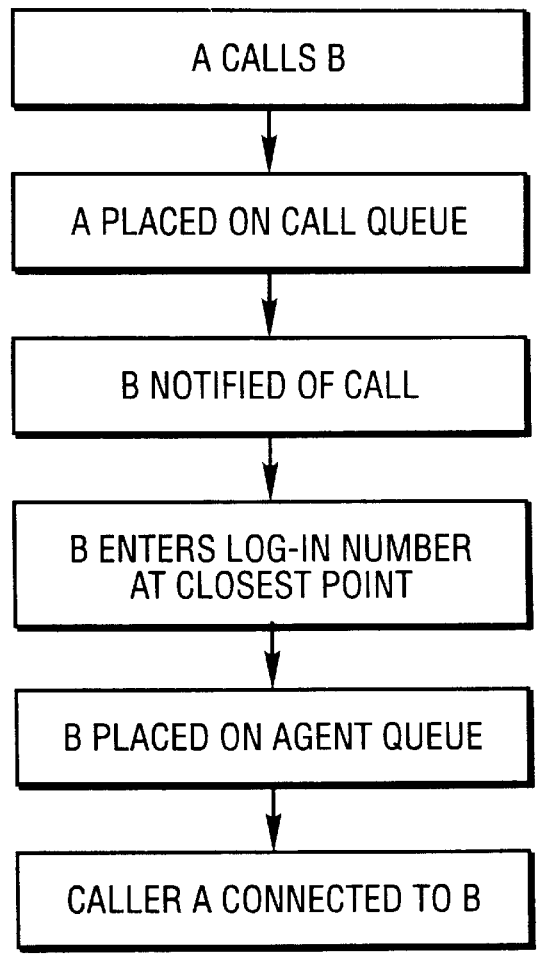
FIG. 2 is a block diagram of the method steps of the present invention.

With reference to FIG. 2, the method of operation of the present invention is described. First, Caller "A", the calling party, calls "B", the secondary party. Upon receipt and identification of the calling party, Caller A is then temporarily placed on call queue 18. The called party, B, is then notified of the call. Next, B enters a pre-determined log-in number from the closest phone. Upon entering the log-in number, B is put on agent queue 20 and marked available. Finally, system 10 connects caller A to secondary party B.

While the best modes for carrying out the invention have been described in detail, those familiar with the art to which this invention relates will recognize various alternative designs and embodiments for practicing the invention as defined by the following claims.

What is claimed is:

1. A system for a subscribing party to selectively retrieve communications from calling parties at a predetermined plurality of subscribing party Customer Premises Equipment (CPE) devices, each of said CPE devices placed at a different geographical location and having a corresponding communication address, the system comprising:

a central office switch (COS) in electrical communication with said calling parties and said CPE devices, said COS adapted to identify communications from said calling parties which are directed to said subscribing party, place said identified communications on a call queue, and generate corresponding paging signals in a predetermined sequence for receipt by said CPE devices at their corresponding communication addresses; and identification means in electrical communication with said COS, said identification means adapted to receive a subscriber specific log-in number from one of said CPE devices selected by said subscribing party, identify a corresponding communication on said call queue, place said selected CPE device on an agent queue, mark said subscribing party as being available, and connect said corresponding communication to said subscribing party at said selected CPE device.

2. A system as in claim 1, wherein said COS is provisioned with Automatic Call Distribution (ACD) architecture.

3. A method for a subscribing party to selectively retrieve communications from calling parties at a predetermined plurality of subscribing party Customer Premises Equipment (CPE) devices, each of said CPE devices placed at a different geographical location and having a corresponding communication address, the method comprising the steps of:

identifying communications from said calling parties which are directed to said subscribing party;

placing said identified communications on a call queue;

generating corresponding paging signals in a predetermined sequence for receipt by said CPE devices at their corresponding communication addresses;

receiving a subscriber specific log-in number from one of said CPE devices selected by said subscribing party;

identifying a corresponding communication on said call queue;

placing said selected CPE device on an agent queue;

marking said subscribing party as being available; and connecting said corresponding communication to said subscribing party at said selected CPE device.

\* \* \* \* \*